United States Patent Office 3,357,991
Patented Dec. 12, 1967

3,357,991
ALKYLENEMONOTHIOLCARBONATE PREPARATION
Edward A. Swakon, Hammond, Ind., assignor to Standard Oil Company, Chicago, Ill., a corporation of Indiana
No Drawing. Filed June 6, 1962, Ser. No. 200,324
2 Claims. (Cl. 260—327)

This invention relates to sulfur-containing compounds and more specifically to olefin monothiolcarbonates and polymeric olefin sulfides having in the polymer unit one sulfur atom per olefin hydrocarbon residue.

In U.S. Patent 2,828,318, there is disclosed the preparation of monothiolethylene carbonate by reacting 2-mercaptoethanol with phosgene in the presence of pyridine. The monothioethylene carbonate:

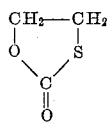

was heated in the presence of sodium carbonate to form ethylene sulfide. Durden et al. reported in J. Am. Chem. Soc., 82, 3082 (1960), the reaction of carbon disulfide with ethylene oxide in the presence of trimethylamine at 34 atmospheres nitrogen pressure and at 150° C. to produce ethylene trithiocarbonate (2-thio-1,3-dithiolane.) More recently Durden et al. reported in J. Org. Chem., 26, 836 (1961), the attempts to make monothiolethylene carbonate by reacting carbonyl sulfide with ethylene oxide in the presence of trimethylamine at 500 p.s.i. nitrogen pressure and 150° C. However, it is clear that monothiolethylene carbonate was not produced and neither was there produced a polymeric $(CH_2CH_2—S)_x$ compound whose polymeric unit would contain 40% carbon, 6.7% hydrogen and 53.3% sulfur. Rather, there was produced what was reported as copolymers containing about two-thirds ethylene sulfide and about one-third ethylene thiolcarbonate units.

I have found that olefin oxides undergo interesting reactions with carbonyl sulfide in the presence of a certain class of base catalysts. When the reaction is carried out at a temperature of below 150° C., or suitably 120° C. or below, e.g., −50 to 120° C. and preferably 0 to 100° C. monothiololefin carbonates are formed according to the following reaction:

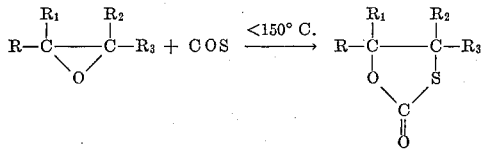

wherein R, $R_1$, $R_2$ and $R_3$ can be alike or different substituents such as hydrogen or alkyl, cycloalkyl, aralkyl, aryl or alkaryl hydrocarbon groups. When the monothiololefin carbonates are formed in the presence of highly alkaline base, there is a tendency for the conversion of the monothiololefin carbonate to a polymeric olefin sulfide by decarboxylation. This decarboxylation (liberation of $CO_2$) is appreciably enhanced by heating the monothiololefin carbonate to an elevated temperature, e.g. 150° C. However, when the olefin oxide or sulfide is reacted with COS in the presence of the base catalyst at temperatures of from 20° C. to 200° C. at the pressure generated by COS in a closed reaction vessel, a polymeric olefin sulfide is directly formed. The formation of the polymeric olefin sulfide can be suppressed by treatment of the reaction mixture with dilute and/or weak acid and, thus, even in the case of the more readily decarboxylated monothiololefin carbonates such as that obtained from the styrene and divinyl benzenes the decarboxylation can be substantially prevented especially at 25 to 50° C. by acidification of the reaction product with weak and/or dilute acid. Both mineral and organic acids, diluted or weak of a strength corresponding to a pH of 6 or less, may be used.

The class of base catalysts effective for either of the above reactions are tertiary amines as, for example, triethylamine, pyridine, tributylamine; guanidine; tetraalkyl guanidines especially tetramethyl guanidine; aqueous and alcoholic alkali such as potassium hydroxide and sodium hydroxide as well as sodium and potassium alcoholates; the carbonates, acetates, hydroxides and formates of metals of Groups I, II and III of the Periodic Table. Although COS reacts with certain of these base catalysts such reactions are in equilibrium and their products are catalysts and/or the free base still present by virtue of the equilibrium functions as the catalyst.

Both reactions can be carried out with or without a reaction solvent. Useful solvents include ethanol, methanol, benzene, ether, dimethyl formamide, carbon tetrachloride, trichloroethane, acetone, petroleum ether, hexane, heptane, pentane, liquid tertiary amines which also function as catalysts such as pyridine, triethylamine, tributylamine, and the like. Although the alcohols may react with COS, this competing reaction may be suppressed by choice of temperature, catalyst, etc. depending upon the olefin oxide reactant.

Any olefin oxide of the class hereinbefore illustrated with respect to the reaction equation can be employed. Among these suitably are ethylene oxide, propylene oxide, styrene oxide, octylene oxide, terpene oxide, cyclohexene oxide (wherein R and $R_3$ are joined in a ring with the two carbon atoms attached to the oxygen or sulfur atom to form a six-membered ring and $R_1$ and $R_2$ are hydrogen), 1-cyclohexyl ethylene oxide, 3-methyl styrene oxide, 1-benzyl ethylene oxide, and others.

The processes of this invention are illustrated by the following specific examples:

Example 1

A 300 ml. stainless steel reactor is charged with 29 g. propylene oxide, 31 g. COS (cooled in Dry Ice) and 1 g. tetramethyl guanidine and sealed and the mixture is heated to 49° C. The reaction is maintained at this temperature for two hours. Vent gas from the reactor is passed through a Dry Ice trap but no COS condensed. The reactor is cooled to room temperature and vented. There is recovered 49 g. of a water-white liquid product having a refractive index of 1.4553 at 20° C.

The product is treated with 50 g. of cold 5% $H_2SO_4$ solution; it becomes cloudy white. It is extracted with approximately 200 ml. of ethyl ether and dried over Drierite. p-Toluene sulfonic acid (0.5 g.) is added to stabilize the product. The product is then distilled, first at atmospheric pressure to 36° C. to remove ether and unreacted starting material and then at 1.3–1.5 mm. Hg. under which conditions 17 g. of monothiolpropylene carbonate is collected boiling at 70–75° C. Infrared shows a strong carbonyl band. An additional 5.6 g. of material is collected boiling over 100° C. at 1.3 mm. Hg.

Example 2

A 300 ml. stainless steel reactor is charged with 29 g. propylene oxide, 30 g. COS and 1 g. tetramethyl guanidine and heated at 38° C. for three hours. The reactor is cooled immediately in cold water. About 1 g. of liquid (COS) is trapped out in Dry Ice trap from vent gases. There is obtained 47 g. of brown liquid. One-tenth gram of p-toluene sulfonic acid is added and the product is distilled under reduced pressure. 8.5 g. of material is condensed in Dry Ice trap and 22 g. of monothiolpropylene carbonate is distilled at 75–80° C./2.5 mm. Hg. There is 11.5 grams of material as bottoms in the distillation flask.

*Example 3*

In another run similar to Example 2, 3 g. of product is condensed out from vent gases and 62 g. of brown liquid is obtained. The product is stabilized with 1 g. of p-toluene sulfonic acid and distilled. First 13 g. of volatile material is condensed in Dry Ice trap, 22.5 g. of product distills at 63–66/0.5–1.5 mm. and 13 g. remains as bottoms, 11.7 g. are lost. The product which distills at 63–65° C./0.5–1.5 mm. is monothiolpropylene carbonate.

*Example 4*

A 300 ml. stainless steel reactor is charged with 30 g. of styrene oxide, 15 g. carbonyl sulfide and 1 g. of tetramethyl guanidine and kept at room temperature; 1 g. of COS is recovered from vent gases in Dry Ice trap. There is produced 46 g. of yellow liquid. This was monothiolstyrene carbonate. It is unstable at room temperature and atmospheric pressure and decomposes by giving off $CO_2$, due to the presence of the guanidine catalyst. Treatment of the reaction mixture with dilute hydrochloric acid or acetic acid to neutralize the catalyst suppresses the decarboxylation.

*Example 5*

A 300 ml. stainless steel reactor is charged with 22 g. ethylene oxide, 30 g. COS, 1 g. tetramethyl guanidine and 0.25 g. of sodium methoxide. The reactor is sealed and slowly heated to 180° C. A temperature of 180° C. is maintained for five hours. Analysis of vent gases (mass spectroscopy) shows the gas is mostly $CO_2$ (89.6%). No material is condensed in the Dry-Ice trap from the vent gases. 35 g. of brown grease-like material is obtained. It is insoluble in acetone and in methanol and formed insoluble white flocks.

*Example 6*

A 300 ml. stainless steel reactor is charged with 30 g. COS, 22 g. ethylene oxide and 1 g. tetramethyl guanidine sealed and rocked at room temperature for 18 hours. Final pressure is 170 p.s.i.g. Approximately 5 g. of water-white liquid is trapped out of vent gases in Dry Ice trap. This is probably mostly excess COS. 33 g. of white powdery solids are recovered. It melted from 155–174° C. and is insoluble in cold acetone, methanol, benzene, ether and water. When a portion of the white solid is heated on a hot plate, it melts and some gas evolution occurs. On cooling to room temperature, a hard off-white solid is obtained.

A sample of the above white powdery solids is recrystallized three times from morpholine. The purified product melts at 144–148° C. Elemental analysis for carbon and hydrogen of the purified solid and that calculated for polymeric ethylene sulfide is as follows:

*Analysis.*—Calculated for: C, 40.00; H, 6.77. Found: C, 40.64; H, 6.87.

*Example 7*

A 300 ml. stainless steel reactor is charged with 30 g. styrene oxide, 15 g. carbonyl sulfide and 1 g. of tetramethyl guanidine. The reactor is rocked for 18 hours and final pressure builds up to 200 p.s.i.g. One gram of COS is recovered when vent gases are passed through Dry-Ice trap.

Gas analysis of vent gas showed 61% $CO_2$ and 28.4% COS. 46 g. of yellow liquid is recovered. Gas is evolved from the product. Analysis of the gas given off from the product shows it to be $CO_2$ (96.1%). The product increases in viscosity with loss of $CO_2$. The product is believed to be polystyrene sulfide.

*Example 8*

A 300 ml. stainless steel reactor is charged with 30 g. COS, 22 g. ethylene oxide, 1 g. tetramethyl guanidine and 50 ml. methanol sealed and allowed to rock overnight (18 hours) at room temperature. Vent gas analysis shows mostly COS (68.7%) and $CO_2$ (15.3%). Vent gas passes through Dry-Ice trap when 1 g. of liquid is condensed. 93 g. of honey-colored liquid is recovered. Methanol is evaporated on the steam bath where an off-white waxy material is obtained.

The process of Examples 1 through 8 can be carried out employing either of the base catalysts hereinbefore disclosed to produce equivalent results. However, the use of tetramethyl guanidine as catalyst is preferred.

The monothiololefin carbonates can be used as mercapto-alkylating agents or decomposed in the presence of a basic material such as sodium carbonate to the corresponding olefin sulfide or converted to the polymeric olefin sulfide as hereinbefore disclosed.

What is claimed is:

1. A method of preparing monothiolpropylene carbonate or monothiolstyrene carbonate which comprises reacting carbonyl sulfide with propylene oxide or styrene oixde respectively at a temperature in the range of 25 to 50° C. in the presence of tetramethyl guanidine as catalyst in a vented reaction zone, cooling the reaction mixture to ambient temperature, acidifying the cooled reaction mixture with p-toluene sulfonic acid, and recovering the monothiolcarbonate product by distillation at a reduced pressure in the range of 0.5 to 2.5 mm. Hg absolute.

2. The process of claim 1 wherein propylene and carbonyl sulfide are reacted at 38° C. to 49° C. and monothiolpropylene carbonate is recovered.

References Cited

UNITED STATES PATENTS

| | | | |
|---|---|---|---|
| 2,225,573 | 12/1940 | Tendeloo et al. | 260—327 |
| 2,828,318 | 3/1958 | Reynolds | 260—327 |
| 3,213,108 | 10/1965 | Osborn et al. | 260—327 |
| 3,240,788 | 3/1966 | Broderick et al. | 260—327 |

OTHER REFERENCES

Durden et al.: J. F. Org. Chem., vol. 26, pp. 836–39 (1961).

WALTER A. MODANCE, *Primary Examiner.*

JAMES A. PATTEN, W. H. SHORT, LEON J. BERCOVITZ, *Examiners.*

M. P. HENDRICKSON, M. I. MARQUIS,
*Assistant Examiners.*